(12) United States Patent
Corghi

(10) Patent No.: US 6,640,612 B2
(45) Date of Patent: Nov. 4, 2003

(54) METHOD AND APPARATUS FOR DETERMINING THE EFFICIENCY OF A VEHICLE'S SHOCK ABSORBERS

(75) Inventor: Remo Corghi, Correggio (IT)

(73) Assignee: Corghi S.p.A., Corregio (IT)

( * ) Notice: Subject to any disclaimer, the term of this patent is extended or adjusted under 35 U.S.C. 154(b) by 0 days.

(21) Appl. No.: 09/930,236

(22) Filed: Aug. 16, 2001

(65) Prior Publication Data

US 2002/0043096 A1 Apr. 18, 2002

(30) Foreign Application Priority Data

Sep. 6, 2000 (IT) .................................... RE2000A0085

(51) Int. Cl.$^7$ ........................................... G01M 15/00
(52) U.S. Cl. ..................................... 73/11.04; 73/11.04
(58) Field of Search ............................... 74/84, 230.17, 74/473, 474, 479, 480, 481, 482, 501, 502; 73/11.04, 11.07

(56) References Cited

U.S. PATENT DOCUMENTS 3,915,023 A * 10/1975 Lacroix ............... 74/230.17 B
5,182,958 A * 2/1993 Black ........................... 74/84

* cited by examiner

Primary Examiner—Kamand Cuneo
Assistant Examiner—Monica D. Harrison
(74) Attorney, Agent, or Firm—Browdy and Neimark, P.L.L.C.

(57) ABSTRACT

A method for determining the efficiency of a vehicle's shock absorbers, comprising the following operational steps: identifying, by virtue of image acquisition means, at least one point of the vehicle rigid with the shock absorber lower connection, and at least one point of the vehicle rigid with the shock absorber upper connection; associating said at least two points with a cartesian reference system; subjecting the vehicle or at least a wheel thereof to a non-horizontal forcing stress; memorizing a succession of photograms in order to acquire the equations of motion of said at least two points and calculating the equation resulting from the difference between the two equations of motion; determining from said equation the parameters necessary to evaluate the shock absorber efficiency.

9 Claims, 2 Drawing Sheets

METHOD AND APPARATUS FOR DETERMINING THE EFFICIENCY OF A VEHICLE'S SHOCK ABSORBERS

This patent relates to a method for evaluating the efficiency of vehicle shock absorbers to facilitate their adjustment or replacement as required, and the device for implementing the method.

The known devices used to evaluate the efficiency of a vehicle's shock absorbers are based on measuring and sensing instruments of electromechanical type. They generally comprise a movable platform on which the wheels of the vehicle front or rear axle are rested. Having positioned the wheels on the platform, suitable mechanical means transmit a stress to the platform, which transmits it to the vehicle via the suspensions. The oscillations which the platform undergoes as a result of the transmitted stress are sensed by suitable means, these oscillations being proportional to the oscillations of the vehicle. By analyzing the maximum amplitude of the oscillation and its damping time, the effectiveness of the vehicle suspension (shock absorbers) can be evaluated.

The known devices suffer however from a series of problems which limit their accuracy. In said devices the evaluation of the vehicle suspension efficiency done in the described manner is influenced by the deformations which the tyre undergoes during the measurement.

To take account of the deformations undergone by the tyre, the manufacturers of these devices take account of the fact that the frequency of the tyre oscillations is different from that of the vehicle oscillations. However, it has been found that the results obtained with devices such as that described vary greatly, in accordance with the tyre inflation pressure.

The object of this invention is to overcome the drawbacks of the known art within the context of a rational and reliable solution which is able to shorten the time used to verify the suspension efficiency, and does not require the provision of a measuring site.

The invention attains said object by a method for verifying the shock absorber efficiency, and by an apparatus for implementing the method, which is able to measure and also take account of the deformations undergone by the tyre during the measurement.

To this end the apparatus of the invention uses image acquisition means connected to a processor to process the acquired images.

The method of the invention comprises the following operational steps:

identifying, by virtue of image acquisition means, at least one point of the vehicle rigid with the shock absorber lower connection, and at least one point of the vehicle rigid with the shock absorber upper connection, associating said two points with a Cartesian reference system in order to identify their height from the ground and hence their distance apart, subjecting the vehicle or at least one wheel thereof to a non-horizontal forcing stress, memorizing a succession of photograms in order to acquire the equations of motion of said at least two points, calculating the equation resulting from the difference between the two equations of motion, determining from said equation the parameters necessary to evaluate the shock absorber efficiency.

In greater detail, the method of the invention comprises acquiring and processing a certain number of images at least of a portion of the vehicle close to that shock absorber the efficiency of which is to be verified, in order to identify at least one reference point of the vehicle rigid with the shock absorber lower connection, and at least one reference point of the vehicle rigid with the shock absorber upper connection.

The reference point of the vehicle rigid with the shock absorber lower connection can be a chosen point on the wheel rim, such as a point on the wheel rim edge. Instead, the reference point of the vehicle rigid with the shock absorber upper connection can be any chosen point on the vehicle chassis close to the shock absorber under examination.

Said reference points are determined according to the invention by seeking and identifying within the images those regions in which the transition between the grey levels is a maximum, as explained hereinafter.

In detail, to speed up the processing of the acquired images and to be certain that the point rigid with the shock absorber lower connection is a point on the wheel rim edge, the invention, after identifying a certain number of points apparently pertaining to the wheel rim edge, calculates the equation of the conic section, such as an ellipse or a circumference, passing through these points and, as the reference point rigid with the lower connection, chooses on the wheel rim at least one point pertaining to that conic section, or related to it, such as the centre of the conic section itself.

Instead, said at least one reference point rigid with the vehicle chassis is chosen, according to the invention, about a point having a height greater by 20% than the height of the highest point of the major diameter of that conic section representative of the edge of the vehicle wheel rim.

Having identified said at least two reference points and associated them with a Cartesian reference system, the method of the invention subjects the vehicle to a non-horizontal stress and at the same time acquires a certain number of images of the event, i.e. of the oscillations undergone by the vehicle following the transmitted stress, to be able to construct the equation of motion of the two individual points.

It should be noted that in processing the acquired images to determine the equation representative of the motion of said at least two points, any vehicle movements in a horizontal direction due to the transmitted stress will be compensated.

According to the invention, the number of images sufficient to reconstruct the equation of motion of the two points must be between 20 and 150 images per second.

Knowing the two equations of motion the method of the invention calculates the equation resulting from the difference between them, to determine the relative oscillation between the two reference points alone. This oscillation represents the oscillation of the vehicle suspensions, following the application of the stress, net of the deformations undergone by the tyre.

Knowing this equation, the shock absorber efficiency can be verified by analyzing suitable specific parameters, such as the maximum amplitude of the oscillation and the time required to damp the oscillation amplitude to below a determined value.

The method of the invention is implemented by an apparatus comprising at least one image acquisition device, such as a photographic camera or video camera, installed on a movable support element and intended to frame at least a portion of the vehicle close to the shock absorber the efficiency of which is to be verified. In particular the lens of said image acquisition device is able to frame the vehicle wheel at that shock absorber of which the efficiency is to be verified, and at least a portion of the vehicle chassis close to that wheel. Said image acquisition device is also connected to a processing station preferably provided with a display for displaying the results.

It is apparent that the invention can achieve the same result by using either an image acquisition device for each wheel or a single image acquisition device plus the use of suitable optical paths achieved with the aid of fixed and/or movable mirrors and possible shutters, which enable all the wheel to be seen in succession from the filming point.

The stress which is transmitted to the vehicle, or to a wheel of the vehicle, can be caused either manually by the operator, or by usual means of mechanical type, for example a hydraulic or pneumatic jack positioned below the vehicle chassis and arranged to raise the vehicle chassis from the ground.

The special characteristics of the device and of the method are specified in the claims.

The method and device of the invention will be better understood from the ensuing description of a preferred embodiment thereof, given by way of non-limiting example and illustrated in the accompanying drawings.

Figure 1:
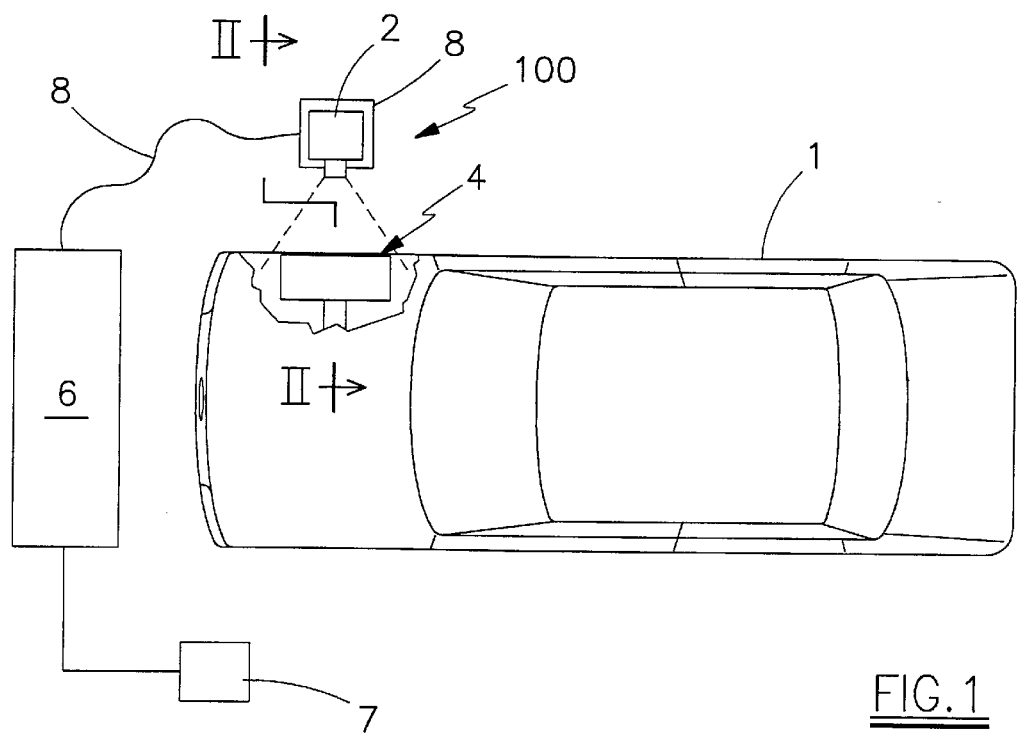
FIG. 1 is a view of the device of the invention and a vehicle seen from above.
Figure 3:
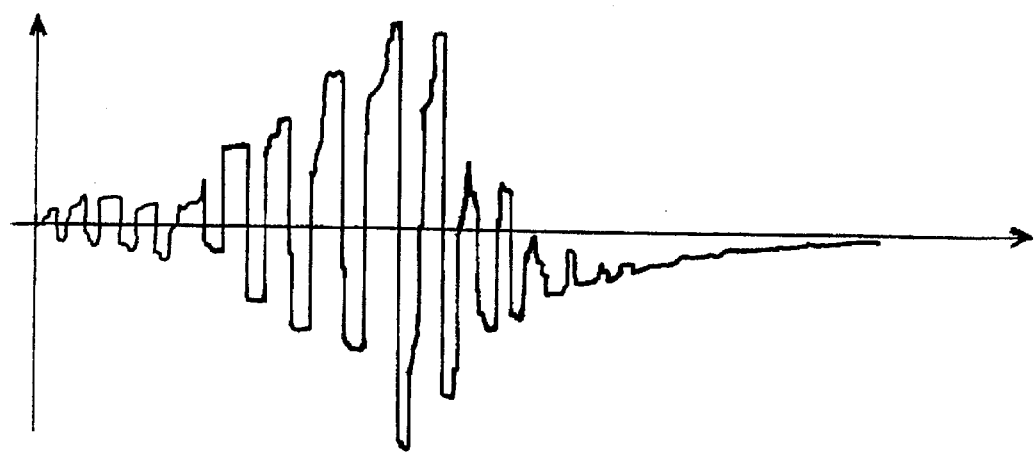
FIG. 3 shows the variation in the oscillations displayed on the video terminal of the operator.
Figure 2:
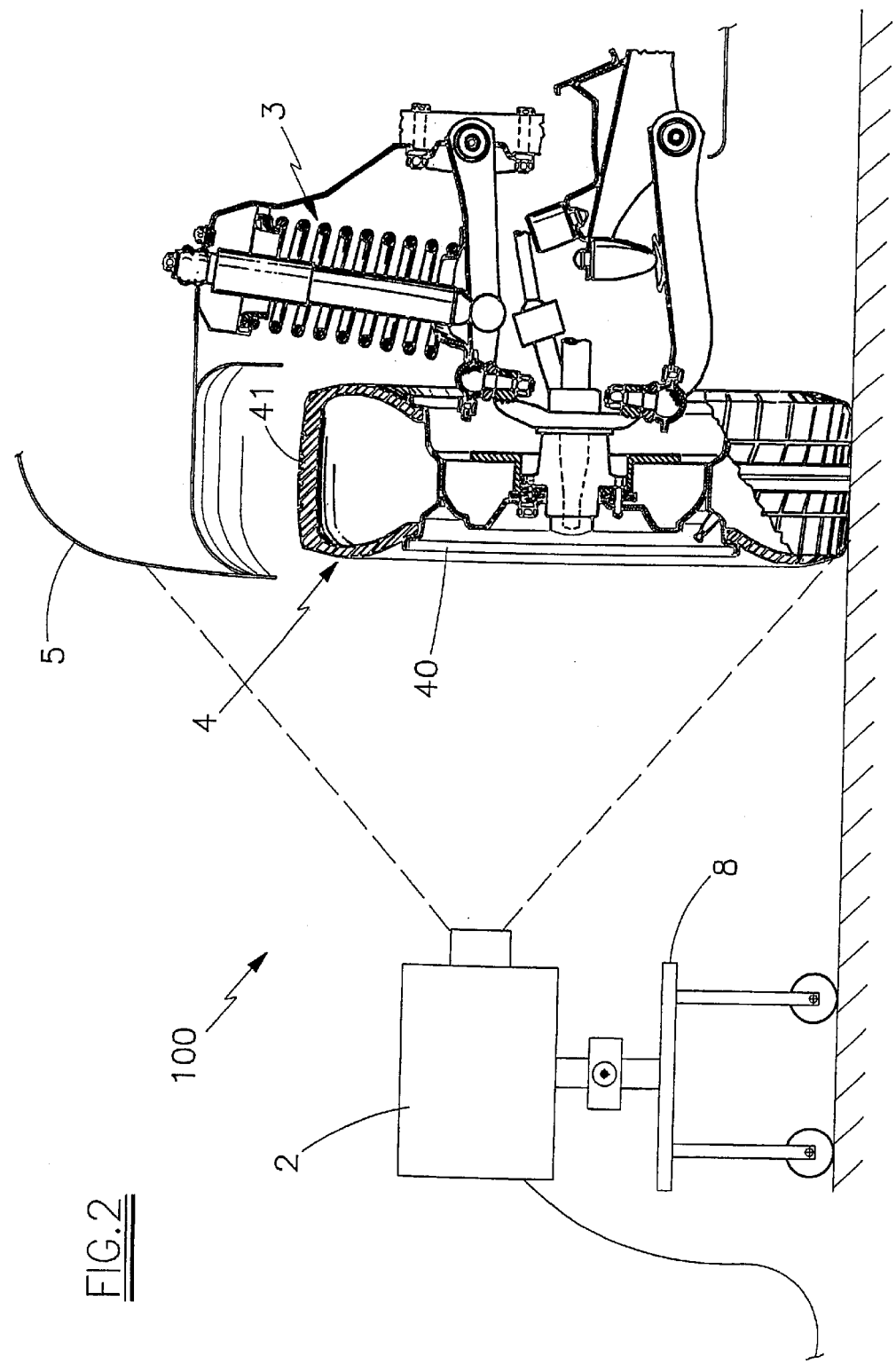
FIG. 2 is a partial schematic view of the section II—II of FIG. 1.

Said figures show the vehicle 1 and the apparatus 100 for verifying the efficiency of the vehicle shock absorbers. Said apparatus 100 comprises an image acquisition device 2 positioned to the side of the vehicle; in the illustrated example said device 2 is an active matrix video camera.

The lens of the device 2 is arranged to frame that portion of the vehicle 1 at the shock absorber 3 the efficiency of which is to be verified. In particular, the lens of said image acquisition device 2 frames the wheel 4 of the vehicle 1, inclusive of the rim 40 and the tyre 41, and a portion of the vehicle chassis 5 close to the wheel 4.

The images acquired by the device 2 are fed to a processor 6 which processes them and displays the results of this processing on a video terminal 7. The images acquired by the device 2 are transmitted along suitable cables 8, but can also be transmitted by a usual radio, infrared or ultrasonic transmission system.

In the illustrated embodiment of the invention the device 2 is mounted on a support carriage 8 and is arranged to verify the efficiency of one vehicle shock absorber 3 at a time. Consequently to verify the efficiency of all the vehicle shock absorbers 3, the operator must position the image acquisition device each time in front of the shock absorber the efficiency of which is to be verified.

However, according to a variant of the invention, the efficiency of the shock absorbers 3 can be verified by positioning the device 1 in a fixed position and, with the aid of fixed or movable optical mirrors and possibly shutters, using suitable optical paths such as to enable the lens of the device 2 to selectively acquire the images of the vehicle 1 at each shock absorber 3.

The apparatus 100 is able to implement the method of the invention. According to this method, after positioning the device 2 as shown in the figures, this acquires at least one image of the vehicle portion close to the shock absorber 3 the efficiency of which is to be verified. Said image must comprise at least a portion of the vehicle wheel and at least a portion of the vehicle chassis.

From said at least one image, the processor calculates at least one reference point rigid with the lower connection of the vehicle shock absorber, and at least one reference point rigid with the upper connection of the vehicle shock absorber. As the point rigid with the shock absorber lower connection, the method of the invention uses a point pertaining to the vehicle wheel rim, and in particular a point on the wheel rim edge. Instead, as the reference point rigid with the shock absorber upper connection, the method of the invention uses a point chosen on the vehicle body.

Said at least two points are identified by identifying within the images those regions in which the transition between the grey levels in the image is a maximum. For this purpose to reduce the "noise" (disturbances) present in the acquired images, the method of the invention uses suitable filters, for example of Gaussian type. The filtering operation consists of calculating the new value of a pixel on the basis of the value of the original pixels within a region of size n×n centered on the pixel itself. For example if n=3, the new pixel is obtained by weighting the original values with the following matrix:

$$A = \frac{1}{16} \cdot \begin{bmatrix} 1 & 2 & 1 \\ 2 & 4 & 2 \\ 1 & 2 & 1 \end{bmatrix}$$

At this point the method of the invention comprises identifying the elements of the wheel rim edge. For this purpose a zero crossing filter is used. This filtering operation also consists of calculating the new value of a pixel on the basis of the value of the original pixels within a region of size n×n centered on the pixel itself. For example if n=3, the new pixel is obtained by weighting the original values with the following matrix:

$$K = \begin{bmatrix} 1 & 2 & 1 \\ 2 & -12 & 2 \\ 1 & 2 & 1 \end{bmatrix}$$

The points pertaining to the wheel rim edge are identified by those regions of the obtained image in which adjacent pixels change sign, i.e. where there is passage through zero. These regions correspond to the points of maximum transition rapidity in the changes of grey tones. If high precision measurements are required, the position of these transition points can be located using known Spline interpolation functions.

After determining a certain number of transition points apparently pertaining to the edge of the wheel rim 40 of the vehicle 1, the wheel rim edge is identified by the invention with reference to a conic section model, such as an ellipse, in order to concentrate the search for the reference points within concentrated regions and to speed up the calculation procedure. Having determined the ellipse equation representing the wheel rim 40, the reference point chosen is either a point pertaining to said ellipse or a point related to it, for example the centre of the ellipse.

Said at least one reference point rigid with the upper connection on the vehicle chassis is instead identified which, besides having maximum grey transition, is located at a level higher by 15–20% of the major diameter of the identified ellipse. Having determined at least two reference points in the described manner, the method of the invention comprises subjecting the vehicle to a stress such as to cause oscillation of the shock absorber the efficiency of which is to be verified. This stress can be easily applied manually by the operator, or can be applied by a jack, not shown, acting on the vehicle chassis.

By means of the device 2 a certain number of images of the event are acquired, and for each acquired image the position of said at least two reference points is calculated. In this manner on termination of the event the equations of motion are obtained for said two reference points with respect to the origin of the reference system chosen, for example with respect to the vehicle support surface. The equation of motion of the reference point rigid with the shock absorber upper connection represents the vehicle oscillation as a result of the transmitted stress, this oscillation also comprising the deformation which the tyre 41 undergoes. Instead, the equation of motion of the reference point rigid with the shock absorber lower connection is representative of the deformations undergone by the tyre 41 as a result of the transmitted stress.

In processing the acquired images the invention also takes account of any horizontal displacements of the vehicle resulting from the transmitted stress. To obtain a number of points sufficient to calculate the aforesaid equations of motion, a number of images of between 20 and 150 per second must be acquired. Knowing the equations of motion of said two points a calculation can be made of the relative oscillation of the two reference points, i.e. the oscillation which the vehicle suspension undergoes independently of the tyre deformations. Said relative oscillation also comprises any slack in the suspension arms and their deformations. To eliminate these disturbances those terms of higher order than the second must be eliminated from the equation, to obtain an equation representative of the shock absorber oscillations alone.

Having obtained said equation the parameters needed to evaluate the shock absorber efficiency can be calculated, i.e. the maximum over-elongation, the maximum amplitude of the oscillations, and the time required to damp the oscillation to below a certain predetermined value.

Having determined said parameters characteristic of the phenomenon, the processor compares these data with those of a database and displays the degree of efficiency of the shock absorber on the basis of the result of this comparison.

What is claimed is:

1. A method for determining the efficiency of a vehicle's shock absorbers, characterised by comprising the following operational steps:

identifying, by virtue of image acquisition means, at least one point of the vehicle rigid with the shock absorber lower connection, and at least one point of the vehicle rigid with the shock absorber upper connection, associating said at least two points with a cartesian reference system in order to identify their height from the ground and hence their distance apart, subjecting the vehicle or at least a wheel thereof to a non-horizontal forcing stress, memorizing a succession of photograms in order to acquire the equations of motion of said at least two points, calculating the equation resulting from the difference between the two equations of motion, determining from said equation the parameters necessary to evaluate the shock absorber efficiency.

2. A method as claimed in claim 1, characterised in that said at least one point rigid with the shock absorber lower connection is chosen from the points pertaining to the vehicle wheel rim.

3. A method as claimed in claim 2, characterised in that said at least one point rigid with the shock absorber lower connection is chosen from the points pertaining to the edge of the vehicle wheel rim.

4. A method as claimed in claim 1, characterised in that said at least one point rigid with the shock absorber upper connection is a point on the vehicle chassis.

5. A method as claimed in claim 1, characterised in that said necessary parameters comprise at least the maximum amplitude of the oscillation and the time required to damp the oscillation amplitude to below a predetermined value.

6. A method as claimed in claim 1, characterised by comprising the further operational step of comparing said necessary parameters with those contained in a database.

7. A method as claimed in claim 1, characterised in that said forcing stress is caused manually by the operator.

8. A method as claimed in claim 1, characterised in that said forcing stress is caused by suitable mechanical means.

9. A method as claimed in claim 8, characterised in that said mechanical means are a hydraulic or pneumatic jack acting on the vehicle chassis.

* * * * *